United States Patent
Sasaki et al.

(10) Patent No.: US 7,126,893 B2
(45) Date of Patent: Oct. 24, 2006

(54) INFORMATION RECORDING APPARATUS AND CONTROL METHOD THEREOF

(75) Inventors: Yoshio Sasaki, Saitama (JP); Hidenori Nakagawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 682 days.

(21) Appl. No.: 10/461,359

(22) Filed: Jun. 16, 2003

(65) Prior Publication Data

US 2004/0037189 A1 Feb. 26, 2004

(30) Foreign Application Priority Data

Jun. 19, 2002 (JP) ............................. 2002-178524

(51) Int. Cl.
*G11B 5/09* (2006.01)
(52) U.S. Cl. ............................. 369/47.22; 369/59.15; 369/124.01
(58) Field of Classification Search ............... None
See application file for complete search history.

(56) References Cited

U.S. PATENT DOCUMENTS

| | | |
|---|---|---|
| 2002/0098806 A1 | 7/2002 | Park |
| 2002/0110059 A1* | 8/2002 | Usui et al. ............... 369/47.28 |
| 2004/0013065 A1* | 1/2004 | Udagawa ................. 369/47.51 |

FOREIGN PATENT DOCUMENTS

| | | |
|---|---|---|
| EP | 1 205 918 | 5/2002 |
| EP | 1 209 679 | 5/2002 |
| EP | 1 280 140 | 1/2003 |
| JP | 11-073668 | 3/1999 |
| JP | 2001-357529 | 12/2001 |

* cited by examiner

*Primary Examiner*—Muhammad Edun
(74) *Attorney, Agent, or Firm*—Young & Thompson

(57) ABSTRACT

An information recording apparatus includes a pickup which irradiates a recording light to a disc on which prepits are formed and which outputs return light quantity data, a period determination circuit which determines a data obtaining period in which return light quantity is not affected by the prepit, a sample-hold circuit which obtains the return light quantity in the data obtaining period, and a microcomputer which controls a recording power based on the return light quantity data. The microcomputer obtains the return light quantity data in the data obtaining period in which the return light quantity is not affected by the prepit, and executes control including the recording power control based on the return light quantity data. As a sample-hold circuit detects a pit level and the like in a 9T to 11T period which is hardly affected by the LPP and controls the recording power based on the result, proper recording power control can be executed.

7 Claims, 5 Drawing Sheets

FIG. 3A  RECORDING MARK TO BE FORMED 
FIG. 3B  RETURN LIGHT IN REPRODUCTION 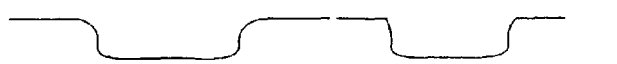
FIG. 3C  RECORDING PULSE WAVEFORM IN RECORDING 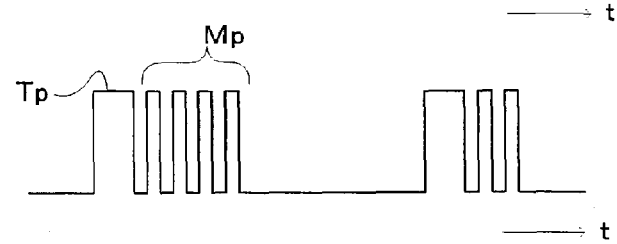
FIG. 3D  LIGHT RECEIVING QUANTITY S2 IN RECORDING 
FIG. 3E  RETURN LIGHT QUANTITY DATA S3 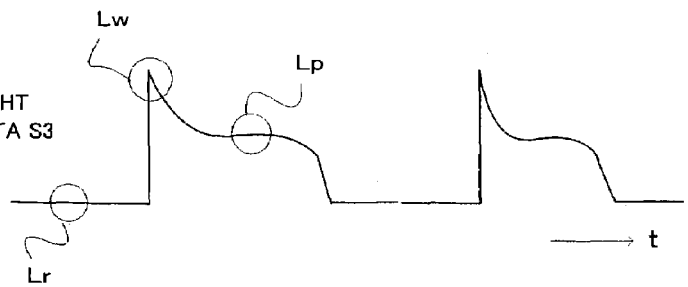

FIG. 4A  RECORDING MARK TO BE FORMED (14T)
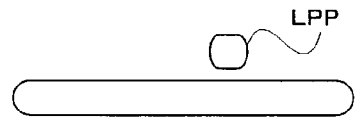
FIG. 4B  RECORDING PULSE WAVEFORM IN RECORDING
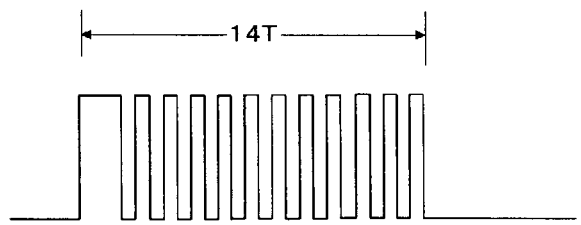
FIG. 4C  LIGHT RECEIVING QUANTITY S2 IN RECORDING
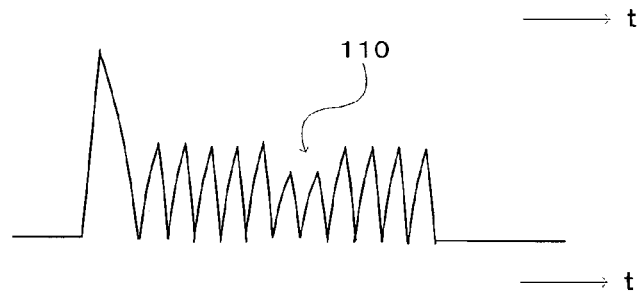
FIG. 4D  RETURN LIGHT QUANTITY DATA S3
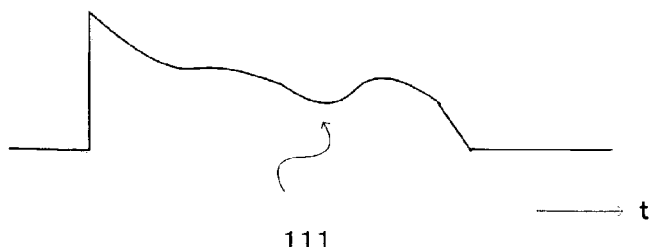

INFORMATION RECORDING APPARATUS AND CONTROL METHOD THEREOF

BACKGROUND OF THE INVENTION

1. Field of the Invention

This invention relates to an information recording technique to an optical disc.

2. Description of Related Art

When information is recorded on an optical disc, various controls are executed in order to form pits (recording marks) of accurate shapes corresponding to information to be recorded. Some of them detect a return light from an optical disc which is generated by irradiating a recording laser beam to the optical disc, and execute various controls for recording, based on the return light quantity.

As an example of such controls, there is known ROPC (Running Optimum Power Control) which controls a recording power so as to always form constantly-shaped pits during recording. The ROPC detects a return light from an optical disc while a recording laser beam is irradiated onto the disc, and controls the recording power of the laser beam based on the level of the return light. A recording power control by ROPC can be applied to optical discs such as CD-R (Compact Disc-Recordable) DVD-R and DVD-RW.

However, in cases of DVD-R and DVD-RW, which are different from CD-R, there is a problem that the return light quantity from the disc varies due to the existence of prepits because prepits such as land-prepits (LPP) are formed on a recording surface of the disc. Specifically, grooves serving as recording tracks and lands are alternately formed in a radial direction on the recording surface of DVD-R and DVD-RW. On the lands, LPPs including addresses and other information are formed according to a predetermined rule. Return light quantity of a recording laser beam which is used to the control such as ROPC varies by the existence of the LPPs. The problem is that a current pit forming condition is recognized incorrectly and proper recording power adjustment can not be executed because of this variation of the return light quantity.

This problem is not limited to the case of ROPC. Namely, in the case of other controls which are executed by using the return light quantity of the recording laser beam during recording, accurate controls cannot be executed because the existence of prepits varies the return light quantity.

SUMMARY OF THE INVENTION

This invention is implemented in view of the above, and its object is to execute accurate controls for optical discs such as DVD-R and DVD-RW, on which prepits are formed, by eliminating the influence of the return light quantity variation due to the existence of prepits.

According to one aspect of the present invention, there is provided an information recording apparatus including: a recording unit which irradiates a recording light to a disc on which prepits are formed, detects a return light from the disc and outputs return light quantity data; a data obtaining period determining unit which determines a data obtaining period in which the return light is not affected by the prepit; a return light quantity data output unit which obtains and outputs the return light quantity data in the data obtaining periods; and a controller which performs control based on the return light quantity data output from the return light quantity data output unit.

By the information recording apparatus thus configured, a recording light is irradiated on the disc, and a return light is detected to output return light quantity data. The disc is formed with the prepits in advance, and a period in which the return light is not affected by the prepit is determined as a data obtaining period. Then, the return light quantity data during the data obtaining period is obtained, and a certain control is performed based on the return light quantity data thus obtained. Therefore, the control can be properly performed with eliminating the influence by the prepits.

The data obtaining period determining unit may determine a period other than a period in which the recording unit forms 14T recording mark or 14T space as the data obtaining period. Since the prepit exists neighboring the 14T recording marks and 14T spaces with high possibility, those are eliminated from the data obtaining unit.

The information recording apparatus may further include a prepit detector which detects a period in which the prepit exists based on the return light, and the data obtaining period determining unit may detect a period other than a period in which the prepit exists as the data obtaining period. With this configuration, the existence of the prepit is directly detected and the data obtaining period is determined not to include the detected prepit.

The controller may include a determining unit which determines whether a power of the recording light is proper or not based on a level of the return light quantity data at a predetermined timing; and a power controller which controls the power of the recording light based on a result of a determination by the determining unit. Thus, the power of the recording light can be properly controlled with eliminating the influence of the prepits.

The determining unit may determine whether the power of the recording light is proper or not based on an average level which is obtained by averaging the levels of the return light quantity data at a plurality of the predetermined timing. By averaging the level of the return light quantity data, the influence of the prepits may be suppressed.

In a preferred example, the data obtaining period determining unit may determine a period in which the recording unit forms recording marks of 9T to 11T as the data obtaining period.

According to another aspect of the present invention, there is provided a control method of an information recording apparatus including: a process of irradiating a recording light on a disc on which prepits are formed; a process of detecting return light quantity from the disc and outputting return light quantity data; a process of determining a data obtaining period in which the return light is not affected by the prepits; a process of obtaining and outputting the return light quantity data in the data obtaining period; and a process of performing control based on the return light quantity data obtained in the data obtaining period.

By this control method of the information recording apparatus, a recording light is irradiated on the disc, and a return light is detected to output return light quantity data. The disc is formed with the prepits in advance, and a period in which the return light is not affected by the prepit is determined as a data obtaining period. Then, the return light quantity data during the data obtaining period is obtained, and a certain control is performed based on the return light quantity data thus obtained. Therefore, the control can be properly performed with eliminating the influence by the prepits.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 3A to 3F show waveforms of the respective portions in the information recording apparatus during information recording;

FIGS. 4A to 4D show waveforms of the respective portions in the information recording apparatus.

DETAILED DESCRIPTION OF THE PREFERRED EMBODIMENTS

A preferred embodiment of this invention will be explained below with reference to the attached drawings.

Figure 1:
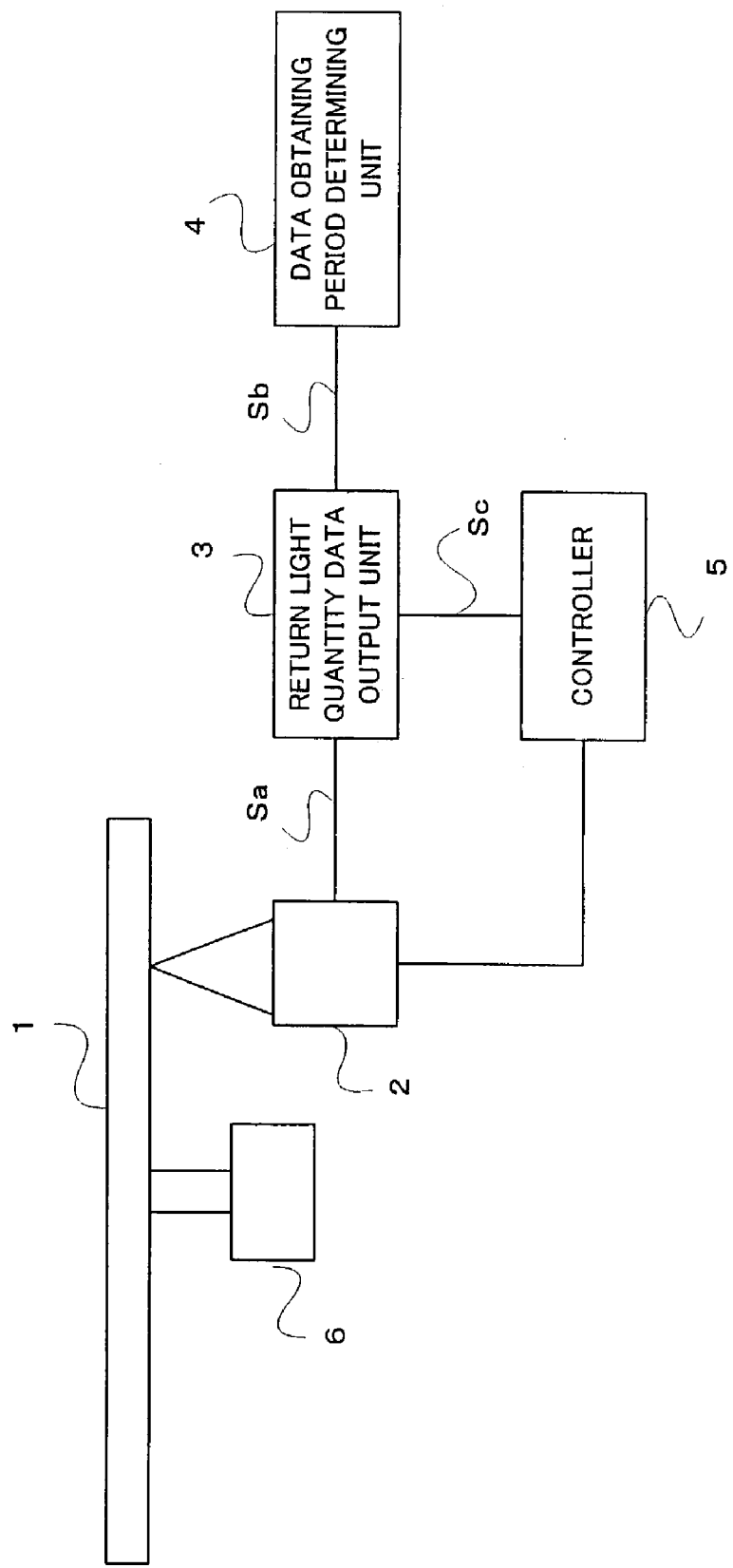
FIG. 1 shows a schematic configuration of an information recording apparatus according to an embodiment of the present invention.

In FIG. 1, a configuration of the information recording apparatus according to a preferred embodiment of this invention is schematically shown. The information recording apparatus shown in FIG. 1 includes a recording unit 2 containing a pickup and the like, a return light quantity data output unit 3, a data obtaining period determining unit 4, a controller 5 and a spindle motor 6.

The spindle motor 6 rotates a disc 1 at a constant linear velocity. A disc 1 is an optical recording medium such as DVD-R and DVD-RW, and prepits are formed on a recording surface in advance. The recording unit 2 irradiates a recording light (a laser beam) to the optical disc 1. At the same time, the recording unit 2 receives a return light from the disc 1, converts it into an electric signal and supplies it to the return light quantity data output unit 3 as a light receiving quantity signal Sa. The data obtaining period determining unit 4 obtains a signal Sb which indicates the data obtaining period and supplies the signal Sb to the return light data output unit 3. From the light receiving quantity signal Sa input to the return light quantity data output unit 3, the return light quantity data during the data obtaining period is used. Specifically, the data obtaining period indicates a period in which the light receiving quantity signal Sa is not affected by the prepits formed on the disc 1, and more specifically the data obtaining period may be a data period except a 14T period.

The return light quantity data output unit 3 selects, based on a period signal Sb supplied from the data obtaining period determining unit 4, only the light receiving quantity signal Sa in the data obtaining period, and outputs it to the controller 5 as the return light quantity data Sc. In this way, the return light quantity data output unit 3 outputs the return light quantity data Sc without the influence or adverse effect of the prepits formed on DVD-R and DVD-RW.

Based on the return light quantity data Sc from which the influence of the prepits is eliminated, the controller 5 executes predetermined control of specific elements in the recording unit 2 and other controlled elements. The controller 5 may be a various kinds of unit which executes predetermined control and correction based on the return light quantity data from the optical disc 1. Specifically, the controller 5 may include a recording power controller which executes ROPC, a .radial tilt correction unit which detects and corrects tilt quantity in the radial direction of the disc 1, a focus position controller which controls the focus position of the recording light with respect to the information recording surface of the disc 1, and a spherical aberration correction mechanism which corrects the spherical aberration of the recording light irradiated on the disc 1.

Next, a preferred example of this invention will be explained. This example employs a recording power controller which controls the recording power by ROPC as the above-mentioned controller. Namely, in this example, a return light quantity data from which the influence of LPPs is removed is utilized in the recording power control by ROPC.

Figure 2:
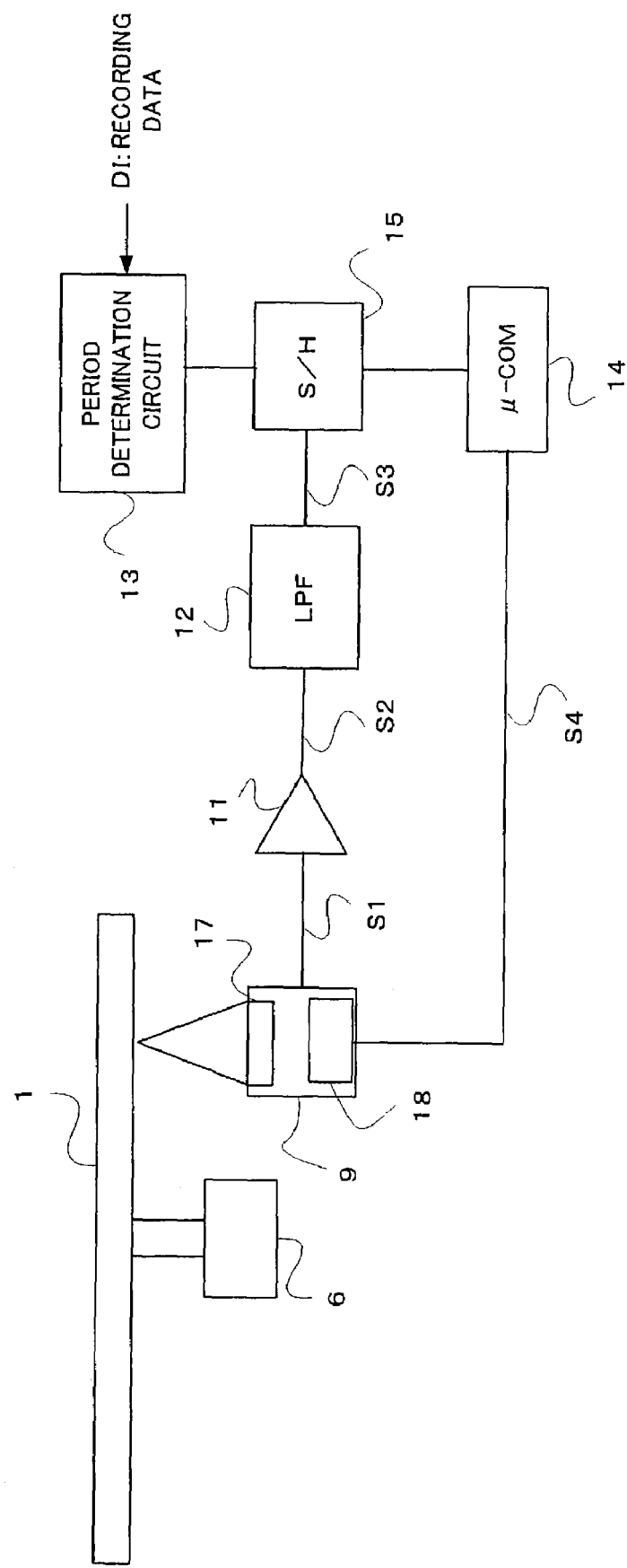
FIG. 2 shows a schematic configuration of an information recording apparatus according to a preferred example of the present invention.

FIG. 2 shows a schematic configuration relating to a recording power control of the information recording apparatus according to this example. In FIG. 2, the disc 1 is rotated at a predetermined linear velocity by the spindle motor 6. A pickup 9 has a laser diode (LD) 17 for emitting a recording laser beam to be irradiated to the disc 1, and a laser diode driver (hereafter, it is called "LD driver") 18 for controlling the laser output power by the laser diode 17.

The pickup 9 receives the return light from the disc 1 and outputs a light receiving quantity signal S1 corresponding to the return light quantity to an amplifier 11. The amplifier 11 amplifies the light receiving quantity signal S1 with an appropriate amplification factor, and supplies it to a lowpass filter (LPF) 12 as a light receiving quantity signal S2. The LPF 12 extracts only low-frequency components from the light receiving quantity signal S2, generates return light quantity data S3 indicating a return light quantity level from the disc 1, and supplies it to a sample-hold (S/H) circuit 15.

On the other hand, recording data DI from outside is input to a period determination circuit 13. The period determination circuit 13 determines, based on the recording data DI, a recording mark period of a predetermined time length in the recording signals, and inputs a signal indicating the period to the sample-hold circuit 15. Here, the recording mark of a predetermined time length is a recording mark corresponding to a long mark such as 9T to 11T mark, other than a 14T recording mark. As a result, the sample-hold circuit 15 holds a level of the return light quantity S3 at a predetermined timing only in the periods corresponding to the recording marks from 9T to 11T, and supplies it to a microcomputer 14. The microcomputer 14 receives the level at the predetermined timing of the return light quantity data S3 from the sample-hold circuit 15, compares it with a reference level which is set in advance, and determines whether the recording power at the point of time is appropriate or not. Then, the microcomputer 14 sends a control signal S4 to the LD driver 18 in the pickup 9 so that the return light quantity data equal to the reference level can be obtained. The LD driver 18 varies the output power of the laser diode 17 based on the control signal S4. Thus, during recording, the recording power control (ROPC) is executed such that constantly-shaped pits are always formed.

Figure 3F:
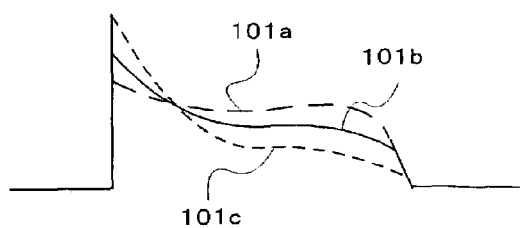

Next, a recording power control will be explained by referring to a waveform of each unit. FIGS. 3A to 3F show recording marks corresponding to the recording data and waveforms of the respective units when the recording data is recorded. FIG. 3A shows shapes of recording marks to be formed corresponding to the recording data. FIG. 3B shows a return light level obtained when the recording marks shown in FIG. 3A are reproduced. FIG. 3C shows a recording pulse waveform output from the laser diode 17 when the recording marks shown in FIG. 3A are formed (that is to say, when the recording data is recorded), and FIG. 3D shows a waveform of the light receiving quantity signal S2 shown in FIG. 2. FIG. 3E shows a waveform of the return light quantity data S3 shown in FIG. 2. Further, FIG. 3F shows a relationship between the waveform of the return light quantity data S3 in cases that the recording power is appropriate and inappropriate.

As shown in FIG. 3A, in a case that a recording mark of predetermined length is formed on the disc, a reproducing signal level which is obtained by irradiating a reading beam to the recording mark is shown in FIG. 3B. In an area where the recording mark is formed, the reflectance of the disc is lower than that in any other areas. As a result, the reproducing signal level becomes low in an area where a recording mark is formed.

On the other hand, when the recording marks as shown in FIG. 3A are formed in recording information, the laser diode 17 is driven in accordance with the recording waveform as shown in FIG. 3C, and the recording laser beam is irradiated to the disc. In the example of FIG. 3C, the recording pulse waveform includes a top pulse Tp whose pulse is wide and multi-pulses Mp which follow the top pulse. The light receiving quantity signal S2 obtained from the disc at that time is shown in FIG. 3D. Namely, in the period corresponding to the top pulse Tp, a recording mark has not been formed on the disc, or not been sufficiently formed although it is being formed. So the reflectance is still high, and the return light quantity level is also high. On the contrary, in the period corresponding to the multi-pulses Mp, since a recording mark has already been formed to some degree, the reflectance is low and the light receiving quantity level is lower than that in the period of the top pulse Tp.

The return light quantity data S3 obtained by extracting low-frequency component from the light receiving quantity signal S2 by the LPF 12 is shown in FIG. 3E. The sample-hold circuit 15 samples and holds a read level Lr, a write level Lw, a pit level Lp and the like from the return light quantity data S3 shown in FIG. 3E. The read level Lr is a return light quantity data level in a case that a read power laser beam is emitted from the pickup 9. The write level Lw is a return light quantity data level in a case that a laser beam corresponding to the top pulse Tp of the recording pulse waveform is output. Since a recording mark has not been formed yet, the reflectance of the disc surface is high and the return light quantity level is also high. The pit level Lp is the return light quantity level in a case that a laser beam corresponding to the multi-pulses Mp of the recording pulse waveform is output, and it shows a laser beam level while a recording mark is being formed.

In a recording power control of this example, the sample-hold circuit 15 obtains either the read level Lr or the write level Lw, and the pit level Lp. The reason why the sample-hold circuit 15 obtains at least one of the read level Lr and the write level Lw is to normalize the pit level Lp by the return light quantity level in an area formed with no recording mark. As a result of this normalization, the variation of the return light quantity due to the reflectance variation and the like is removed, and the recording power control can be executed properly. Therefore, the microcomputer 14 normalizes the pit level Lp by the read level Lr or the write level Lw, compares the result of the normalization with the reference level which is determined in advance, and detects whether the recording laser power being output from the laser diode 17 is appropriate or not.

Three patterns of waveforms of the return light quantity data S3 are shown in the FIG. 3F, i.e., the waveforms in the cases in which the recording power is insufficient (waveform 101a), optimum (waveform 101b) and excessive (waveform 101c) When the recording power is insufficient, the reflectance of the disc surface is still high because a recording mark is not formed sufficiently, and the pit level Lp is also high as shown in the waveform 101a. On the other hand, when the recording power is excessive, the pit level Lp becomes low as shown in the waveform 101c because the reflectance of the disc surface of the recording mark portion becomes too low. Therefore, the microcomputer 14 controls the LD driver 18 to adjust the recording laser power from the laser diode 17 such that the pit level Lp of the return light quantity data S3 is kept optimum.

The period determination circuit 13 supplies the signal indicating the data obtaining period to the sample-hold circuit 15. The data obtaining period is a period corresponding to predetermined long marks in which the return light quantity is not affected by the LPPs. Only in that period, the sample-hold circuit 15 samples and holds the level (in the example, at least either the read level Lr or the write level Lr, and the pit level Lp) of the return light quantity data S3 (see FIG. 3E) output from the LPF 12, and supplies them to the microcomputer 14.

The reason why the period determination circuit 13 selects only the period corresponding to the predetermined long mark is that the recording power determination is not executed properly because the pit level Lp of the recording mark shorter than certain length is unstable. Namely, the period to obtain the pit level Lp corresponds to the area of the multi-pulses Mp as shown in FIGS. 3C and 3E, and depends on the mark length to be recorded. Therefore, in a case of a short mark, since the return light quantity level is not stable enough in the period to obtain the pit level Lp, errors may take place in determining whether a recording power is appropriate or not. On the contrary, in a case of a recording mark of a certain large length, since the period to obtain the pit level Lp is long, the pit level Lp can be detected stably. In this point of view, the long marks which may be appropriately used in detecting the pit level Lp are, for example, 9T to 11T and 14T.

Here, in this example, the return light quantity data S3 is obtained in order not to be affected by the LPPs formed on the disc in advance, and therefore the pit level Lp and the like are not detected from the return light quantity data S3 during the period corresponding to a 14T mark among those long marks. This is because combinations of the 14T mark/ 4T space or the 14T space/4T mark, corresponding to a synchronization signal, are often formed at a position corresponding to the LPP, and hence the return light quantity from the 14T recording mark is susceptible to the influence of the LPPs when the information recording is executed in synchronism with the LPPs.

This will be explained by referring to a comparative example of FIG. 4. FIG. 4A schematically shows a positional relationship between a 14T recording mark and an LPP to be formed, and FIG. 4B shows an example of a recording pulse waveform used in forming a 14T recording mark. FIG. 4C shows a waveform of the light receiving quantity signal S2, and FIG. 4D shows a waveform of the return light quantity data S3 when a 14T recording mark is recorded. In the area shown by arrows 110 and 111 in FIGS. 4C and 4D, the return light quantity temporarily becomes low by the influence of the LPP existing outside the recording track. As shown, if the return light quantity data S3 is generated and utilized with removing a 14T recording mark which is easily affected by the LPPs, proper recording power control can be executed.

In a case that the combination of a 14T space/4T mark is recorded as a synchronization signal, the return light quantity of the 14T space is also affected by the LPP. However, an extent of the influence is smaller than that in the case of the 14T mark for which a recording power is emitted.

Therefore, if the return light is obtained with eliminating only a 14T mark which is seriously affected by the LPP, the influence of the LPP can be eliminated effectively. Moreover, in order to eliminate the influence of the LPP perfectly, the apparatus may be designed to obtain the return light with eliminating not only the periods of the 14T mark but also the periods of the 14T space.

As described above, in this example, the information recording apparatus includes a pickup which irradiates a recording light to the disc 1 on which prepits are formed and which outputs the return light data, a period determination circuit 13 which determines the data obtaining period in which the return light is not affected by the prepits, a sample-hold circuit which obtains the return light quantity data in the data obtaining period, and a microcomputer 14 which controls the recording power based on the return light quantity data. By those, the sample-hold circuit 15 detects the pit level Lp or the like in the recording mark period from 9T to 11T hardly affected by the LPPs, and the recording power is controlled based on the result. Hence, proper recording power control can be executed.

Modification

In the above example, the light receiving quantity signal S1 output from the pickup 9 is processed in the LPF 12, and is held by the sample-hold circuit 15 to obtain the pit level Lp. However, instead of that process, each level can be obtained by peak-holding the light receiving quantity signal S1 output from the pickup 9 by a peak-hold circuit.

Further, in the above example, among the long marks in which the pit level Lp is stable (such as 9T to 11T and 14T) the return light quantity data is not utilized in recording the 14T mark in which the LPP exists with high possibility. Here, the reason why the LPP may exist in the case of 14T mark is that the LPP exists on a neighboring land outside the recording track (groove) subject to the recording (hereinafter referred to as "recording object track" or "recording object groove") because a 14T recording mark corresponding to a sync is frequently recorded at the position of the LPP when executing an information recording in synchronism with the LPP. Therefore, in a case of the recording marks other than the 14T recording mark, there is a possibility that an LPP exists on a land located inner side of the recording object groove. Namely, the LPP corresponds to an inner neighboring recording track of the recording object recording track. However, as the LPP inside the recording object groove corresponds to the groove one track inside, it is not directly associated with the recording mark length of the recording object groove. Namely, although there is a possibility that an LPP exists on a land outside of a 14T recording mark on the recording object groove, an LPP does not always exist on a land inside of the 14T recording mark. Consequently, in the above-described recording power control, if the recording power control is performed by obtaining the pit level at plural points within the long mark period such as 9T to 11T and by utilizing an average of those levels, the influence of the LPP on the land inside the recording object groove can be reduced.

Figure 5:
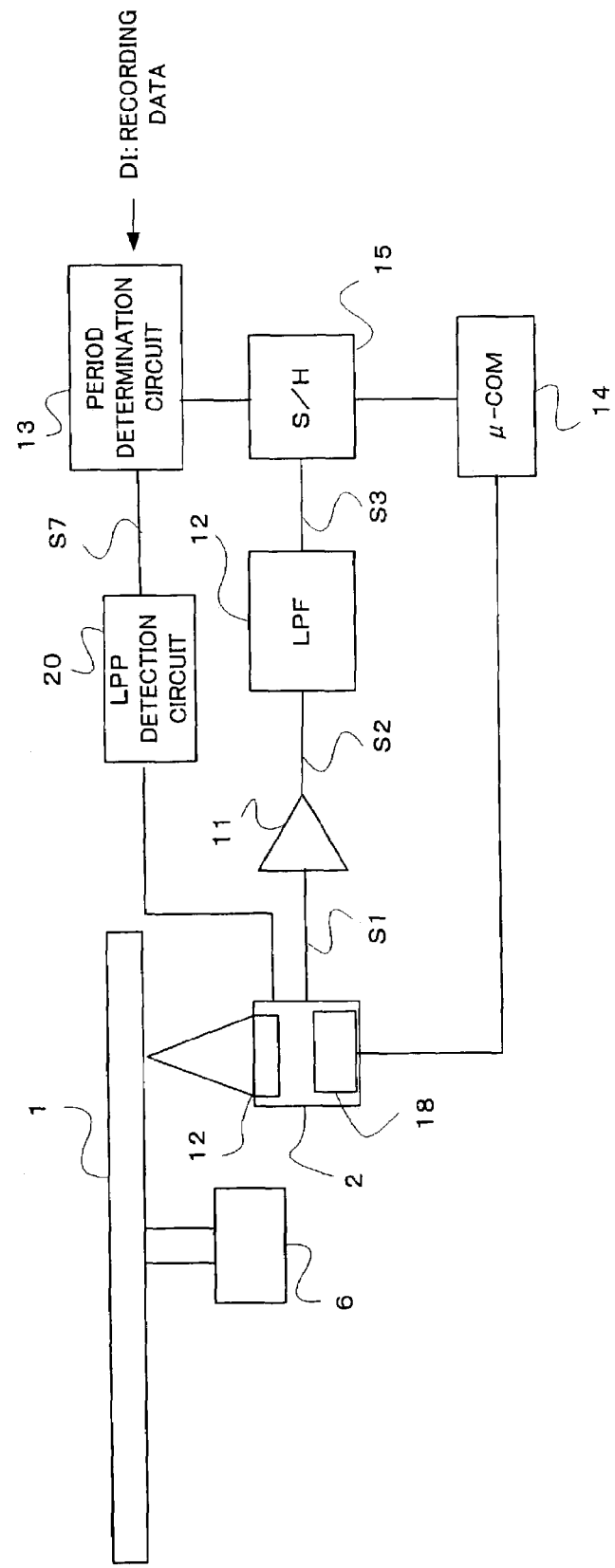
FIG. 5 shows a schematic configuration of an information recording apparatus provided with an LPP detection circuit.

Although the above method reduces the influence of the LPPs existing inside the recording object groove by averaging, it is more preferable that an LPP detector is provided to detect the proper positions of the LPPs and to obtain the return light quantity data at the positions other than the positions of the LPPs in order to perfectly eliminate the influences of the LPPs existing both inside and outside the recording object groove. An example of such a configuration is shown in FIG. 5. Compared with FIG. 2, it is appreciated that an LPP detection circuit 20 is provided to detect the positions of the LPPs from the light receiving quantity signal output by the pickup 9, and an LPP detection signal S7 is input to the period determination circuit 13. Based on the LPP detection signal S7, the period determination circuit 13 makes the sample-hold circuit 15 to perform the sample-hold processing in a period in which LPPs do not exist. As a result, the return light quantity data from which the influences of the LPPs existing inside and outside the recording object groove is eliminated is output from the sample-hold circuit 15.

As described above, by the configuration of the information recording apparatus of this embodiment, since the return light quantity data from which the influences of the LPPs pre-recorded on DVD-R or DVD-RW are eliminated is obtained, various controls and corrections including the recording power control can be executed properly.

Moreover, this method will be more advantageous in view of the future increase of the recording rate. Namely, if the recording rate is increased twice and four times hereafter, the time length of the pit level Lp shown in FIG. 3E will be shorter. While the return light quantity data is obtained in long mark period (9T to 11T) in which the pit level Lp is stable in the above embodiment, a stable period of the pit level Lp becomes shorter as the recording rate increases. As a result, the stable pit level Lp is substantially hard to obtain in the marks other than the marks 11T and 14T. In that case, the marks from which the pit level Lp is obtained may include a 14T mark with higher probability than the case of utilizing the long marks not shorter than 9T, and hence the adverse influences by the LPPs may occur with higher probability. In such a case, by the method of this invention, since the return light quantity data is obtained after the periods including the 14T mark are eliminated, a proper return light quantity data can be obtained with eliminating the influences of the LPPs.

Moreover, while the above embodiment is an example of obtaining data in the periods in which no influence occurs by the land prepits (LPP) formed on the lands of the optical disc, the prepit in this invention is not limited to an LPP but may be other various kinds of prepits.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2002-178524 filed on Jun. 19, 2002 including the specification, claims, drawings and summary is incorporated herein by reference in its entirety.

What is claimed is:

1. An information recording apparatus comprising:
   a recording unit which irradiates a recording light to a disc on which prepits are formed, detects return light from the disc and outputs return light quantity data;
   a data obtaining period determining unit which determines a data obtaining period in which the return light is not affected by the prepit;
   a return light quantity data output unit which obtains and outputs the return light quantity data in the data obtaining periods; and
   a controller which performs control based on the return light quantity data output from the return light quantity data output unit.

2. The information recording apparatus according to claim 1, wherein the data obtaining period determining unit determines a period other than a period in which the recording unit forms 14T recording mark or 14T space as the data obtaining period.

3. The information recording apparatus according to claim 1, further comprising a prepit detector which detects a period in which the prepit exists based on the return light, wherein the data obtaining period determining unit determines a period other than a period in which the prepit exists as the data obtaining period.

4. The information recording apparatus according to claim 1, wherein the controller comprising:
 a determining unit which determines whether a power of the recording light is proper or not based on a level of the return light quantity data at a predetermined timing; and
 a power controller which controls the power of the recording light based on a result of a determination by the determining unit.

5. The information recording apparatus according to claim 4, wherein the determining unit determines whether the power of the recording light is proper or not based on an average level which is obtained by averaging the levels of the return light quantity data at a plurality of the predetermined timing.

6. The information recording apparatus according to claim 4, wherein the data obtaining period determining unit determines a period in which the recording unit forms recording marks of 9T to 11T as the data obtaining period.

7. A control method of an information recording apparatus comprising:
 a process of irradiating a recording light on a disc on which prepits are formed;
 a process of detecting return light quantity from the disc and outputting return light quantity data;
 a process of determining a data obtaining period in which the return light is not affected by the prepits;
 a process of obtaining and outputting the return light quantity data in the data obtaining period; and
 a process of performing control based on the return light quantity data obtained in the data obtaining period.

* * * * *